Dec. 25, 1934. J. ANDERSON 1,985,394

CLUTCH OPERATING MECHANISM

Original Filed July 3, 1929

INVENTOR
John Anderson
BY
ATTORNEY

Patented Dec. 25, 1934

1,985,394

UNITED STATES PATENT OFFICE 1,985,394

CLUTCH OPERATING MECHANISM

John Anderson, New York, N. Y.

Application July 3, 1929, Serial No. 375,623
Renewed May 19, 1934

2 Claims. (Cl. 192—84)

This invention relates to new and useful improvements in automatic electric clutch for generators.

The invention has for an object the provision of a device of the class mentioned which is of simple durable construction, dependable in use and efficient in action, and which can be manufactured and sold at a reasonable cost.

The invention proposes the use of clutches on both ends of a generator shaft or the like, and one clutch connected with a motor or the like, and the other clutch connected with another motor or the like, and means for normally holding the clutches in disengaged position so as to permit an individual engagement of one or the other.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
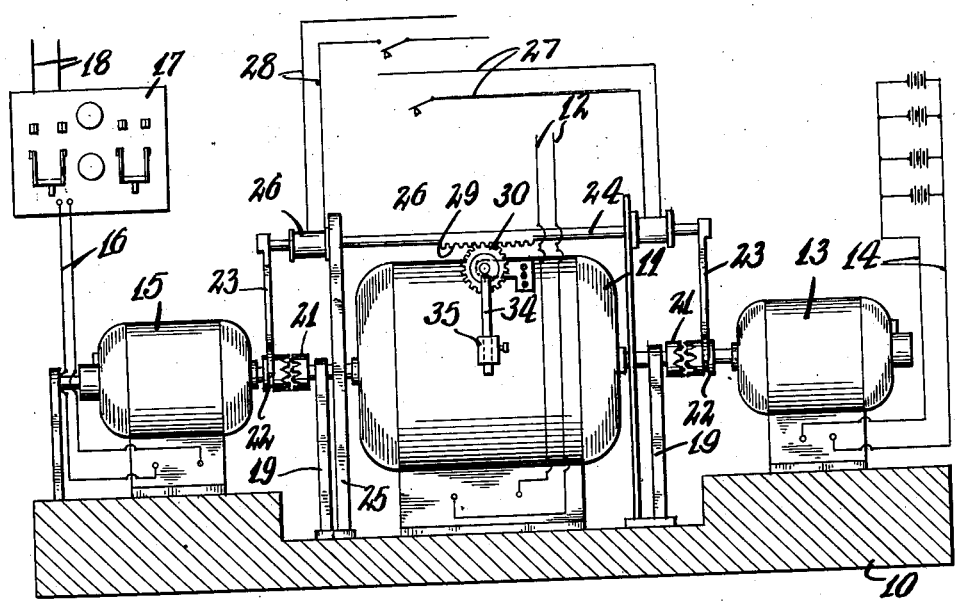
Fig. 1 is an elevational view of a device constructed according to this invention shown upon a base illustrated in section, and schematic wiring being applied.
Figures 2, 3, 4:
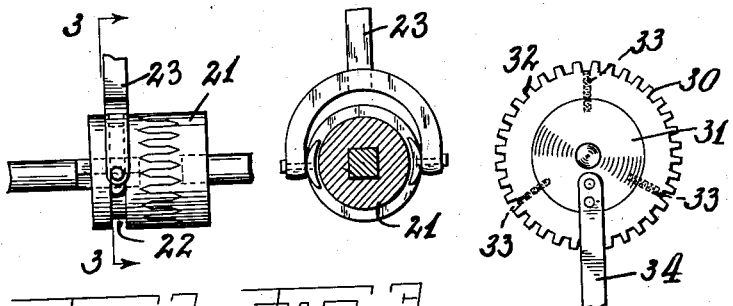
Fig. 2 is an enlarged detail view of a portion of Fig. 1.
Fig. 3 is a cross sectional view taken on the line 3—3 of Fig. 2.
Fig. 4 is another enlarged detail fragmentary view of a different portion of Fig. 1.

The reference numeral 10 indicates generally a foundation upon which a generator 11 is mounted. Leads 12 from this generator may be connected to an electrical appliance intended to receive current. A motor 13 is also mounted upon the foundation 10 and is connected for receiving current from batteries 14. A second motor 15 mounted upon the foundation 10 is connected by leads 16 with a switchboard 17 provided with power supply leads 18.

Standards 19 are mounted upon the foundation 10 and support the armature shaft 20 of the generator 11. Fixed on the ends of the shaft 20 are clutch elements 21. A complementary clutch element 22 is mounted upon the shaft of the motor 13 and another similar clutch element also designated by numeral 22 is mounted upon the shaft of the motor 15. These clutch elements 22 are slidably mounted on the shafts and are engaged by forks 23 attached upon a bar 24 slidably mounted in a standard 25.

Solenoids 26 are mounted upon the standards 25 and around the bar 24. These solenoids are provided with individual pairs of leads 27 and 28 for connection with some source of current.

The placement of the solenoids at the extremities of the bar is such that when one of the solenoids is energized the bar 24 is caused to move in one direction and when the other of the solenoids is energized to move in the other direction.

The bar 24 is provided with rack teeth 29 engaged by a gear 30 rotatively mounted upon the generator 11. This gear consists of a central portion 31 and a rim portion 32. Set screws 33 serve to hold the central and rim portions in adjusted positions. A radius arm 34 is fixed upon the central portion 31 and a weight 35 is fixed upon the free end of the arm 34.

In operation, the rim portion 32 is so adjusted relative to the central portion 31 so that the clutches are normally in a disengaged position, the weight 35 is in its lowest position under the action of gravity. One of the solenoids 26 may be energized for causing the bar 24 to move in one direction for engaging one of the clutches. Such motion of the bar is transmitted to the gear 30 which causes the radius arm 34 to move in the arc of a circle and lift the weight 35. When the current thru this solenoid is cut the weight 35 will return the bar 24 to its normal position with the clutches disengaged.

In the event that the other solenoid was energized the bar would have moved in the opposite direction and the weight 35 similarly raised for returning the bar to its normal position upon the cutting of the solenoid. When the motor 13 is connected for driving the generator 11, the battery 14 is used as a source of power. The voltage delivered by the generator may be different than that of the battery 14. When the motor 15 is used to drive the generator the switchboard 17 may be used to connect the live leads 18 with the motor.

The purpose of the arrangement of a generator with two motors is to allow the second motor which is operated from a secondary source of power distinct from the main source of power of the first motor, to operate the generator in case the main source of power fails. Another advantage of the arrangement is that repairs may be made on the first motor without discontinuing the use of the generator.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a device of the class described, two clutches for connecting two driving members with a driven member, and means normally urging both clutches into a neutral position, comprising a bar with rack teeth, a gear engaging said teeth, and means for urging said gear into a predetermined position, comprising a central section rotatively mounted within said gear, a radius arm and weight fixed to said central section, and means for holding said central section in fixed adjusted positions relative to said gear.

2. In a device of the class described, two clutches for connecting two driving members with a driven member, and means normally urging both clutches into a neutral position, comprising a bar with rack teeth, a gear engaging said teeth, and means for urging said gear into a predetermined position, comprising a central section rotatively mounted within said gear, a radius arm and weight fixed to said central section, and means for holding said central section in fixed adjusted positions relative to said gear, comprising set screws engaging thru said gear and into said central section.

JOHN ANDERSON.